(12) United States Patent
Abert

(10) Patent No.: US 7,457,308 B2
(45) Date of Patent: Nov. 25, 2008

(54) METHOD AND DATA PROCESSING SYSTEM FOR TRANSMITTING DATA VIA A DATA TRANSMISSION UNIT

(75) Inventor: Michael Abert, Au (DE)

(73) Assignee: Siemens AG, Munich (DE)

( * ) Notice: Subject to any disclaimer, the term of this patent is extended or adjusted under 35 U.S.C. 154(b) by 777 days.

(21) Appl. No.: 10/754,544

(22) Filed: Jan. 12, 2004

(65) Prior Publication Data

US 2004/0225615 A1 Nov. 11, 2004

Related U.S. Application Data

(63) Continuation of application No. PCT/DE02/02515, filed on Jul. 9, 2002.

(30) Foreign Application Priority Data

Jul. 10, 2002 (DE) .............................. 101 33 500

(51) Int. Cl.
H04J 15/00 (2006.01)
(52) U.S. Cl. .................... 370/464; 709/247; 710/315
(58) Field of Classification Search ................ 370/466, 370/464; 709/247; 710/21
See application file for complete search history.

(56) References Cited

U.S. PATENT DOCUMENTS

| | | | | |
|---|---|---|---|---|
| 4,147,894 A | * | 4/1979 | Watanabe et al. | 370/465 |
| 5,463,329 A | * | 10/1995 | Kawasaki et al. | 326/77 |
| 5,504,873 A | * | 4/1996 | Martin et al. | 711/111 |
| 6,160,842 A | | 12/2000 | DeLong et al. | |
| 6,233,635 B1 | | 5/2001 | Son | |
| 6,760,779 B1 | * | 7/2004 | Riceman | 709/247 |
| 6,958,995 B1 | * | 10/2005 | Goodman et al. | 370/358 |
| 7,035,663 B1 | * | 4/2006 | Linebarger et al. | 455/552.1 |
| 2001/0055283 A1 | * | 12/2001 | Beach | 370/328 |
| 2002/0097745 A1 | * | 7/2002 | Brolin et al. | 370/466 |
| 2004/0203367 A1 | * | 10/2004 | Nowlin | 455/41.2 |
| 2007/0008990 A1 | * | 1/2007 | Torsner | 370/473 |

FOREIGN PATENT DOCUMENTS

| | | |
|---|---|---|
| EP | 1 081 601 A2 | 3/2001 |
| GB | 2 062 419 A | 5/1981 |
| WO | WO 01/31833 A1 | 5/2001 |

* cited by examiner

Primary Examiner—Seema S. Rao
Assistant Examiner—Wanda Z Russell
(74) Attorney, Agent, or Firm—Sughrue Mion, PLLC

(57) ABSTRACT

A method for transmitting data (D) on one and the same data transmission unit (4) in a particularly simple, secure and rapid manner in accordance with various requirements. For transmitting the data (D) between data processing units (2) of a data processing system (1) via the data transmission unit (4), the data (D) is transmitted in a parallel manner in at least two protocols. The first protocol enables transmission of the data (D) in a first frequency range with a first signal sequence and a first signal level. The second protocol enables further data (D) to be transmitted in a second frequency range with a second signal sequence and a second signal level.

10 Claims, 2 Drawing Sheets

METHOD AND DATA PROCESSING SYSTEM FOR TRANSMITTING DATA VIA A DATA TRANSMISSION UNIT

This is a Continuation of International Application PCT/DE02/02515, with an international filing date of Jul. 9, 2002, which was published under PCT Article 21(2) in German, and the disclosure of which is incorporated into this application by reference.

FIELD OF AND BACKGROUND OF THE INVENTION

This invention relates to a method of transmitting data via a data transmission unit between data processing units of a data processing system. The data processing system is, e.g., a stored program control to automate an industrial installation, in particular a machine, a manufacturing plant or a power plant. The invention also relates to a data processing system.

Data processing systems are used in a variety of ways in industrial automation processes. In complex industrial installations, a plurality of data processing units are combined into complex computer networks and data networks via a data transmission system that has at least one data processing unit. Usually, so-called operator stations or operation and observation units are provided for operating and/or observing the data processing units that control the installation. Each data processing unit has data processing programs for controlling and/or regulating the industrial installation. The data processing program usually runs in the data processing units of the industrial installation and controls, among other things, the exchange of data between the central control unit and components of the industrial installation via the data transmission unit. Therein, the data processing units are, e.g., a central control unit or decentralized on-site controllers. On the one hand, the data processing program transmits switching commands or control values to components, such as actuators. On the other hand, the data processing program reads measured data or characteristic process parameters and/or operating parameters from the components, such as sensors. Depending on the type and design of the industrial installation, a data processing unit may also gain access to the data processing program of another data processing unit.

Usually, when data are exchanged via the data transmission system that has at least one data transmission unit, so-called control signals, address signals and data signals are transmitted between communication partners in accordance with a protocol, i.e., in accordance with rules for time and signal level specifications. Therein, the data transmission system is, e.g., a bus system, and the communication partners are, e.g., data processing units. As the complexity of data processing systems steadily increases due to a steady increase in the number of functions, sensors and actuators, there is also an increase in the networking and, thus, in the exchange of data or information, such as sensor data and control commands. Therein, the communication or data transmission system must have a high level of interference immunity, in particular for security-relevant functions, and must permit especially rapid data transmission.

To achieve a high interference immunity in a communication relationship, in particular when a central controller communicates with process-oriented, decentralized peripheral modules, the data is sent to the peripheral modules via a low-pass filter. This results in a limited bandwidth in the communication relationship, thus limiting the data exchange with regard to the speed and volume of data. Therefore, usually, an increasingly faster data connection and/or data transmission is necessary to meet higher demands regarding data transmission between the central controller and the peripheral modules, for example, or to meet higher demands regarding a connection to the Ethernet, Internet or a bulk memory. To this end, additional bus systems are usually employed in the automation system or in the data processing system. However, expanding the data processing system by adding additional bus systems is especially complicated, and particularly complex and maintenance-intensive with respect to coordinating the data exchange.

OBJECTS OF THE INVENTION

It is one object of the invention to provide a method of transmitting data, via a data transmission unit, between data processing units of a data processing system. This method allows for a particularly simple, rapid and reliable data transmission. It is another object of the invention to provide a data processing system for digital signal processing.

SUMMARY OF THE INVENTION

According to one formulation of the invention, these and other objects are achieved by a method of transmitting data, via a data transmission unit, between data processing units of a data processing system, wherein the data is transmitted in parallel in at least two protocols. When a first protocol is used, the data is transmitted in a first frequency range with a first signal sequence and a first signal level. When a second protocol is used, further data is transmitted in a second frequency range with a second signal sequence and a second signal level. This allows for a slow data exchange and a fast data exchange with the best possible interference immunity via a single physical and, thus, common data transmission unit.

With the steady increase in data volume and the resulting increasing demands with respect to the data volume when data are exchanged (while, at the same time, a very high level of interference immunity and a low hardware complexity is to be maintained), the efficiency of a pre-existing or single physical data transmission unit is to be increased. This requires fault-tolerant and deterministic data protocols with a high data integrity, which select the data, on which the data exchange is based, with different protocol times in accordance with various requirements, and which separate the data in accordance with a respective data transmission protocol. In the data exchange, the data pertaining only to one protocol requirement is taken into account separately from data of another protocol requirement. Thus, the data belonging to the one respective protocol requirement is transmitted separately from the data of other protocol requirements via one and the same data transmission unit. Therein, a bandwidth, which characterizes the respective data transmission unit, is utilized in flexible manner. The data is thus filtered in accordance with the underlying requirement, e.g., a particularly high data integrity at a given data transmission rate or an especially high data transmission rate at a lower level of data integrity. Then, the data is transmitted in separate protocols with regard to time, frequency and signal level. Thus, in a data exchange between data processing units and/or operator units and observation units, respective telegrams that trigger the exchange are differentiated in accordance with their interference immunity and/or their transmission rate. Therein, the use of the same data transmission unit by using different frequency ranges is taken into account. Consequently, a mutual influence of the data transmitted in the various protocols, in particular in different frequency ranges, is reliably prevented in a data exchange, thereby accelerating the exchange of all data to be taken into account.

The data of the first protocol is expediently transmitted asynchronously with an acknowledgment signal (also known as a signal handshake). Preferably, the data of the second protocol is transmitted synchronously with the acknowledgment signal. This ensures that safety-relevant data in particular is transmitted with a particularly high interference immunity. Thus, using the same signals of the respective data transmission unit, data of the first protocol is transmitted separately from the data of the second protocol that have a lower interference immunity. Therefore, when data exchange of faster data is required, i.e., when a connection between exchanging units is established, a so-called acknowledgment cycle is executed by exchanging the acknowledgment signal. Therein, the application of the so-called ready signal is checked only for the time period of the data exchange so as to maintain the interference immunity. If the ready signal is switched during the data exchange, then the telegram pertaining to the data of the second protocol is interpreted as being invalid and discarded.

Alternatively or additionally, the data of the second protocol is provided with security data. This ensures that, in addition to the acknowledgment signal, the data exchange for the fast data of the second protocol is checked for security on the basis of the security data, e.g., on the basis of a cyclic block check (so-called cyclic redundancy check, abbreviated CRC) or on the basis of a check bit or parity bit in the data telegram (so-called parity check).

The data of the first protocol is expediently transmitted at a transmission rate of less than 20 mbps. For a particularly reliable separation of the data of the first protocol from the data of the second protocol, the data is advantageously transmitted at a transmission rate of less than 640 mbps.

To achieve the best possible differentiation of data at different data transmission rates and to avoid the resulting integration effects when the data are transmitted on one and the same data transmission unit, a switching level is assigned to a driver for the first protocol such that the switching level is arranged symmetrically around an H-level of a driver for the second protocol. Preferably, an operating point of 2.5 V with a high level of 5 V and a low level of 0 V is assigned to the driver for the first protocol. Preferably, an operating point of 5 V with a high level of 6 V and a low level of 4 V is assigned to the driver for the second protocol.

According to another formulation of the invention, these and other objects are achieved by a data processing system, which has a plurality of data processing units that are interconnected via a data transmission unit. Therein, data of different requirements are transmitted on the data transmission unit in parallel in at least two protocols. At the transmission end, on the basis of a first protocol, data is transmitted in a first frequency range with a first signal sequence and a first signal level. On the basis of a second protocol, further data is transmitted in a second frequency range with a second signal sequence and a second signal level. At the reception end, a filter belonging to the respective protocol is provided for the data. Due to the separation of the data on the basis of the underlying type of transmission by means of different protocols, frequencies and levels, and due to a filter, which takes this into account on the reception end, it is ensured that one and the same data transmission unit can be used for different data protocols. This reliably avoids a particularly complex and expensive data transmission system.

Advantages achieved with this invention include, in particular, the fact that, due to a bandwidth-optimized transmission of data at different data transmission rates on one and the same data transmission unit, a particularly efficient data transmission unit is ensured. Therein, an existing bus system, which is provided for slow and particularly interference-immune data transmission, can be simultaneously used for high-speed data transmission by defining a faster protocol, wherein the entire bandwidth of the bus system is used. In particular, a so-designed data transmission unit of a data processing system is suitable for consistent and simple maintenance. In addition, such a data transmission unit is particularly economical and effective with regard to availability and employment as an automation system in safety-relevant installations.

BRIEF DESCRIPTION OF THE DRAWINGS

Exemplary embodiments of this invention are explained in greater detail based on the drawings, in which.

Corresponding parts in the figures are provided with the same reference numbers.

DETAILED DESCRIPTION OF THE PREFERRED EMBODIMENTS

Figure 1:
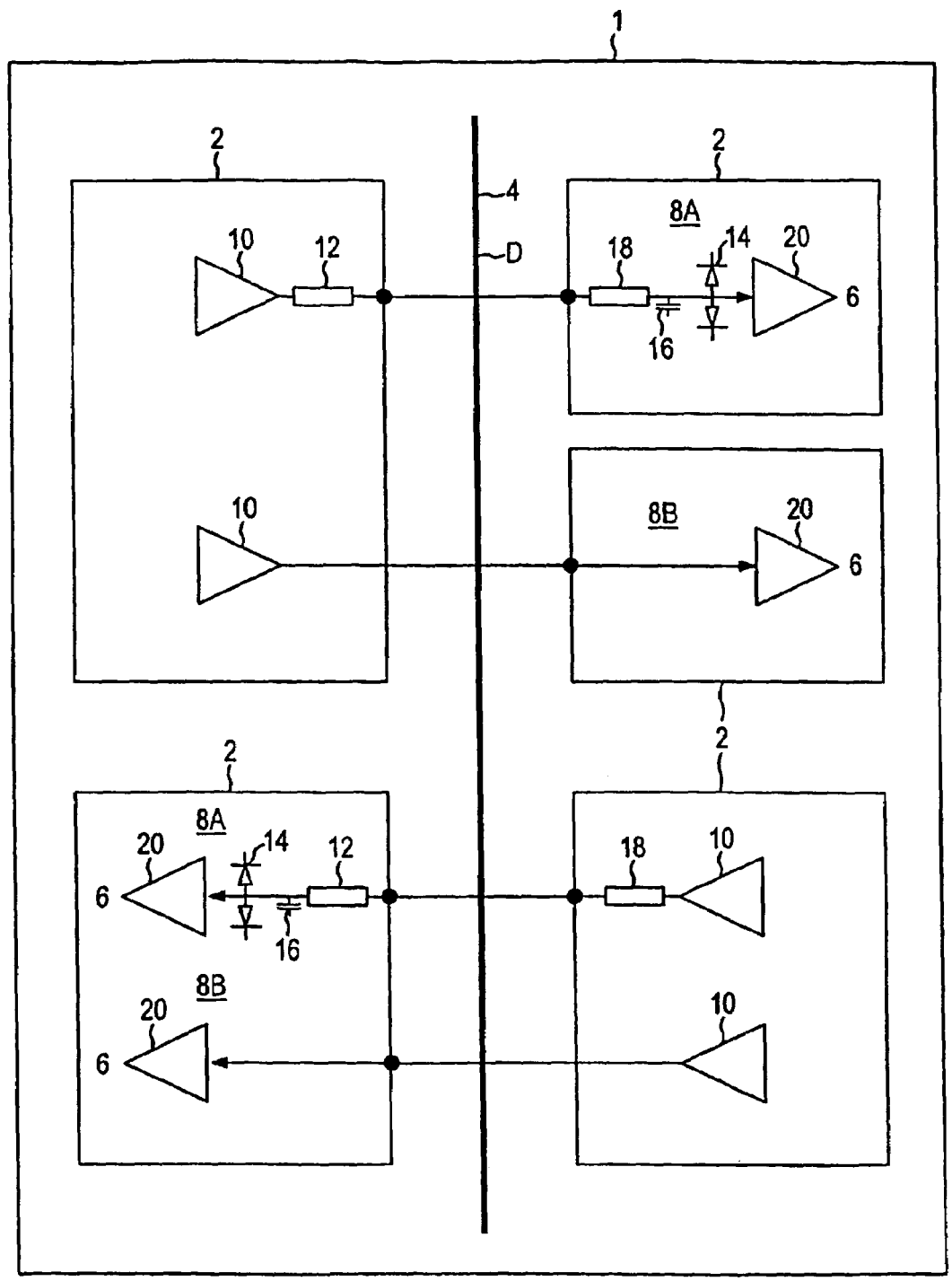
FIG. 1 shows schematically a data processing system having a plurality of data processing units that are interconnected via a data transmission unit.

FIG. 1 shows a data processing system 1 having a plurality of data processing units 2 that are interconnected via a data transmission unit 4. For example, a programmable logic controller or stored program control, a personal computer, or some other data processing unit may serve as the data processing unit 2. The data transmission unit 4 is a standardized transmission line, e.g., an Ethernet coaxial cable, and has standardized transmission elements (not shown), which are also standardized, such as amplifiers, repeaters or bridges. The data processing units 2 are connected to a computer network by means of the data transmission unit 4.

Each data processing unit 2 has computer programs or data processing programs installed on it, by means of which an industrial installation, e.g., a manufacturing plant or a machine tool, is controlled and/or monitored. The data processing program, also called the main program or user software, runs in the data processing unit 2 to trigger and/or detect inputs and/or outputs 6 of respective peripheral modules (not shown). Depending on the type and design of the data processing system 1, the data processing program of a central controller is used for operation and observation of the inputs and/or outputs 6 of decentralized data processing units 2. The decentralized data processing units 2 are designed as so-called on-site controllers for operating and observing the respective inputs and/or outputs 6.

The respective data processing program of the data processing units 2 is modular in design and includes as objects a number of function modules, which take over self-contained control functions and/or regulating functions for the industrial installation. With increased networking of the data processing units 2 by means of the data transmission unit 4, which may be designed as a simple unit or as a redundant system, there is an increase in the exchange of data D, which is necessary for processing the respective data processing programs. Therein, often times, there are different requirements with respect to the security and speed of the data transmission. For example, in the case of safety-relevant functions, a particularly high interference immunity is sufficient during slow data transmission, e.g., when peripheral modules are triggered. On the other hand, in the case of other control functions, the fastest possible data transmission with a low level of immunity is important, e.g., when a large volume of data is stored.

To ensure the various requirements with respect to the security and the speed of the data transmission, the respective data processing unit 2 includes, at the reception end, at least one filter 8A and 8B for the different data on which the data transmissions are based. This filter outputs respective data D as a function of a protocol that characterizes the respective data transmission. At the transmission end, the respective data processing unit 2 includes an amplifier element 10 and, if necessary, a resistor element 12. For the data D, which is to be transmitted in a particularly interference-protected manner, the filter 8A is preferably designed as a low-pass filter. At the reception end of the low-pass filter, the filter filters out the data D of a first protocol, which has a first frequency range, a first signal sequence, and a first signal level. Therein, the filter 8A includes a respective low-pass circuit, which is formed by diodes 14, a capacitor 16 and/or a resistor 18, and an amplifier element 20. The type and design of the filter 8A depend on the first frequency range, the first signal sequence and/or the signal level.

For the data D, which is exchanged at the highest possible data transmission rate between the data processing units 2 and with a lower interference immunity than the data D of the first protocol, the filter 8B includes only an amplifier element 20. A low-pass filter may be omitted here. Depending on the type and design of the respective data processing unit 2, in particular the type of data D to be transmitted, the data processing unit 2 includes a communication module having the filters 8A and 8B. If the data processing unit 2 is provided only for a particularly reliable data exchange, then it has only the filter 8A. If the data exchange includes a plurality of different protocols, each having the respective frequency range, respective signal sequence and/or respective signal level, then the number of filters 8A, 8B will vary accordingly as a function of the number of the predefined protocols.

Figure 2A:
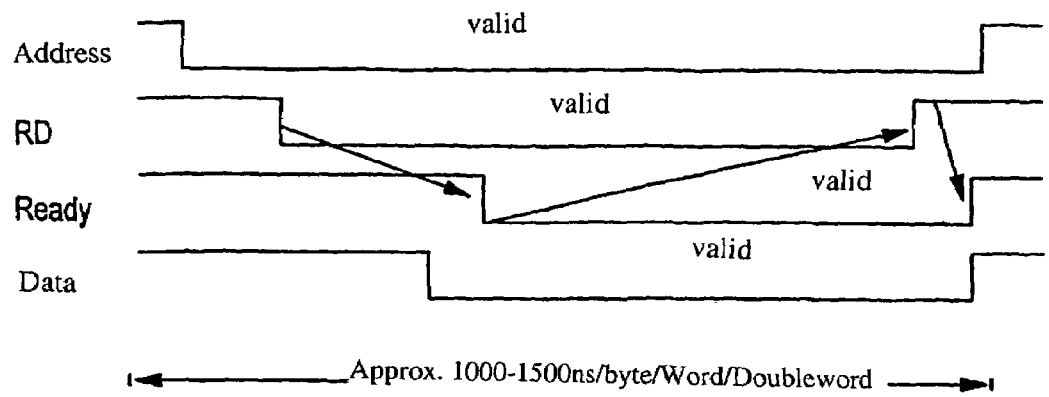
FIGS. 2a, 2b show schematically signal sequences for data with a first protocol and data with a second protocol, respectively.
Figure 2B:
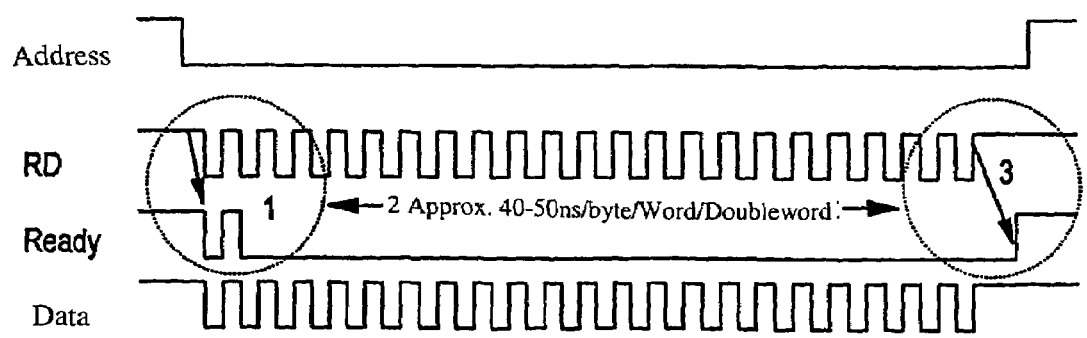

FIG. 2A shows an exemplary embodiment of a signal sequence for the data D of a first protocol for a data exchange that is slow and particularly immune to interference. FIG. 2B shows a signal sequence for the data D of a second protocol for a particularly rapid data exchange. In a data transmission, the data D to be exchanged between the data processing units 2 via the data transmission unit 4 is preferably transmitted in parallel in at least two protocols. Therein, the data D, e.g., so-called "slow data" with regard to the transmission rate, is transmitted, based on the first protocol, in a first frequency range with a first signal sequence and a first signal level. Other data D, e.g., so-called "fast data", is transmitted, based on the second protocol, in a second frequency range with a second signal sequence and a second signal level.

The data D of the first protocol is asynchronously transmitted, together with a "ready" acknowledgment signal (also called a signal handshake). Therein, the transmission rate of the data D is approximately 20 mbps for a so-called 32-bit data bus or approximately 5 mbps for a so-called 8-bit data bus. To separate the data D of the first protocol from the data D of the second protocol, the data is synchronously transmitted in a data transmission via one and the same data transmission unit 4, together with a "ready" acknowledgment signal. Therein, the data is transmitted at a transmission rate of approximately 640 mbps for a so-called 32-bit data bus and/or at a transmission rate of approximately 160 mbps for a so-called 8-bit data bus.

In establishing the connection (represented by the circle labeled with the number "1" in FIG. 2B), an acknowledgment signal (so-called signal handshake) is exchanged in the case of the second, fast protocol. Thereafter, the data is transmitted synchronously (see data transfer phase in FIG. 2B, indicated by the arrow labeled with the number "2"). That is, in reading the data D, for example, 20 ns after a falling edge of signal "RD", the data is transmitted by the data transmission unit 4 with a rising edge of the signal "RD" and is received on the reception end of the respective data processing unit 2. The circle labeled as "3" in FIG. 2B represents the disconnect phase. If, in ongoing data transmission, the "ready" signal switches to "high" while the "RD" signal is "low", then the data transmission of the data D of the second protocol is evaluated as invalid and discarded. In addition, the data D of the second protocol is provided with security data for the purpose of monitoring the data transmission, such as a parity check or a cyclic redundancy check, for example. The signal sequences depicted in FIGS. 2A and 2B show only one physical layer, with may be superimposed with any number of logic layers.

Further, a driver for the first protocol, which represents data transmission of the data D, preferably has a switching level of 2.5 V with a, high level (hereinafter referred to as the H level) of 5 V and a low level (hereinafter referred to as the L level) of 0 V. To rule out integration effects, the switching level of the first driver for the first protocol is arranged symmetrically about an H level of a driver that is provided for the second protocol. Therein, a switching level of preferably 5 V with an H level of 6 V and an L level of 4 V is assigned to the driver for the second protocol. The filter 8A or the input for the driver of the first protocol is to be designed to be as overvoltage-proof as possible, due to the fact that the driver provided for the second protocol has an H level of more than 5 V, which is higher than that of the driver of the first protocol. Depending on the type and number of protocols representing the data exchange, further switching levels or other values for the switching levels may be provided.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for transmitting data via a data transmission unit between data processing units of a data processing system,
   transmitting the data in parallel in at least a first protocol and a second protocol;
   based on the first protocol, transmitting first data of the data in a first frequency range with a first signal sequence and a first signal level; and
   based on the second protocol, transmitting second data of the data in a second frequency range with a second signal sequence and a second signal level;
   wherein a first switching level of the first protocol differs from a second switching level of the second protocol.

2. The method as claimed in claim 1, wherein the first data of the first protocol is transmitted asynchronously, together with an acknowledgment signal.

3. The method as claimed in claim 1, wherein the second data of the second protocol is transmitted synchronously, together with an acknowledgment signal.

4. The method as claimed in claim 1, wherein the second data of the second protocol is provided with security data.

5. The method as claimed in claim 1, wherein the first data of the first protocol is transmitted at a transmission rate of approximately 20 mbps.

6. The method as claimed in claim 1, wherein the second data of the second protocol is transmitted at a transmission rate of approximately 640 mbps.

7. The method as claimed in claim 1, wherein the first switching level is assigned to a first driver that is provided for the first protocol, and wherein the first switching level is symmetrical about an H-level of a second driver that is provided for the second protocol.

8. The method as claimed in claim 7, wherein the first switching level assigned to the first driver for the first protocol is 2.5 V, wherein an H-level of the first driver is 5 V, and wherein an L-level of the first driver is 0 V.

9. The method as claimed in claim 7, wherein the second switching level is assigned to the second driver, wherein the second switching level for the second protocol is 5 V, wherein the H-level of the second driver is 6 V, and wherein an L-level of the second driver is 4 V.

10. A data processing system, comprising:
a plurality of data processing units;
a data transmission unit to interconnect the data processing units, wherein the data transmission unit is configured to transmit data of different requirements in parallel in at least a first protocol and a second protocol; and
at a reception end, at least one filter for the data;
wherein the at least one filter is associated with a respective one of the first protocol and the second protocol;
wherein, on a transmission end, based on the first protocol, first data of the data is transmitted in a first frequency range with a first signal sequence and a first signal level;
wherein, on the transmission end, based on the second protocol, second data of the data is transmitted in a second frequency range with a second signal sequence and a second signal level; and
wherein a first switching level of the first protocol differs from a second switching level of the second protocol.

* * * * *